(12) United States Patent
Harris et al.

(10) Patent No.: US 7,769,409 B2
(45) Date of Patent: Aug. 3, 2010

(54) NETWORK PARTICIPANT STATUS EVALUATION

(75) Inventors: Adam P. Harris, San Diego, CA (US); Glen Van Datta, San Diego, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 644 days.

(21) Appl. No.: 10/875,406

(22) Filed: Jun. 23, 2004

(65) Prior Publication Data

US 2005/0288000 A1    Dec. 29, 2005

(51) Int. Cl.
- H04B 7/00 (2006.01)
- H04B 1/38 (2006.01)
- H05K 11/00 (2006.01)
- H04M 3/16 (2006.01)
- H04M 3/42 (2006.01)
- H04M 1/00 (2006.01)
- H04J 3/16 (2006.01)
- H04J 3/24 (2006.01)
- H04L 12/42 (2006.01)

(52) U.S. Cl. ............... 455/558; 455/41.2; 455/344; 455/412.1; 455/414.1; 455/416; 455/556.1; 455/557; 370/346; 370/349; 370/449

(58) Field of Classification Search ........... 455/41.2, 455/558, 344, 412.1, 414.1, 416, 556.1, 557; 370/346, 449
See application file for complete search history.

(56) References Cited

U.S. PATENT DOCUMENTS 6,704,574 B2 * 3/2004 Lin .................. 455/456.3
6,816,703 B1 * 11/2004 Wood et al. ............. 455/3.04
7,082,316 B2 * 7/2006 Eiden et al. .............. 455/519
7,096,006 B2 * 8/2006 Lai et al. .............. 455/412.1

(Continued)

FOREIGN PATENT DOCUMENTS

EP    1 374 959 A2    1/2004

(Continued)

OTHER PUBLICATIONS

Specification of the Bluetooth System, Dec. 1, 1999, pp. 1, 61-94, 355, XP002263640.

Primary Examiner—Matthew D Anderson
Assistant Examiner—Bobbak Safaipour
(74) Attorney, Agent, or Firm—Frommer Lawrence & Haug LLP; William S. Frommer; Thomas F. Presson

(57) ABSTRACT

Methods and apparatus for obtaining and providing status information for network devices. In one implementation, a wireless device includes: an antenna; a wireless communication interface connected to said antenna and supporting wireless communication across a wireless connection provided by said antenna; a memory supporting storing data; and a controller connected to said wireless interface and to said memory, supporting an application service and a network evaluation service; wherein said application service provides execution and management of one or more application programs accessible by said controller using application data stored in said memory, said network evaluation service provides evaluation of status information of other devices available for wireless communication through said wireless interface and provides status information of the wireless device to another device upon request, and status information provided by said network evaluation service includes information indicating at least one application program for which application data is stored in said memory.

15 Claims, 5 Drawing Sheets

U.S. PATENT DOCUMENTS

| | | | |
|---|---|---|---|
| 2002/0183004 A1* | 12/2002 | Fulton et al. | 455/41 |
| 2003/0045359 A1* | 3/2003 | Leen et al. | 463/42 |
| 2003/0162556 A1* | 8/2003 | Libes | 455/507 |
| 2004/0085947 A1 | 5/2004 | Ekberg et al. | |
| 2005/0064939 A1* | 3/2005 | McSheffrey et al. | 463/42 |
| 2005/0221858 A1* | 10/2005 | Hoddie | 455/557 |
| 2006/0084504 A1* | 4/2006 | Chan et al. | 463/39 |
| 2009/0111532 A1* | 4/2009 | Salokannel et al. | 455/574 |

FOREIGN PATENT DOCUMENTS

| | | |
|---|---|---|
| JP | 2001 53901 | 2/2001 |
| JP | 2002 10321 | 1/2002 |
| JP | 2004 135778 | 5/2004 |
| JP | 2004 136009 | 5/2004 |
| JP | 2004 141225 | 5/2004 |
| JP | 2005 319047 | 11/2005 |
| JP | 2005 323116 | 11/2005 |
| JP | 2005 323117 | 11/2005 |
| WO | WO 2004/038541 A2 | 5/2004 |

\* cited by examiner

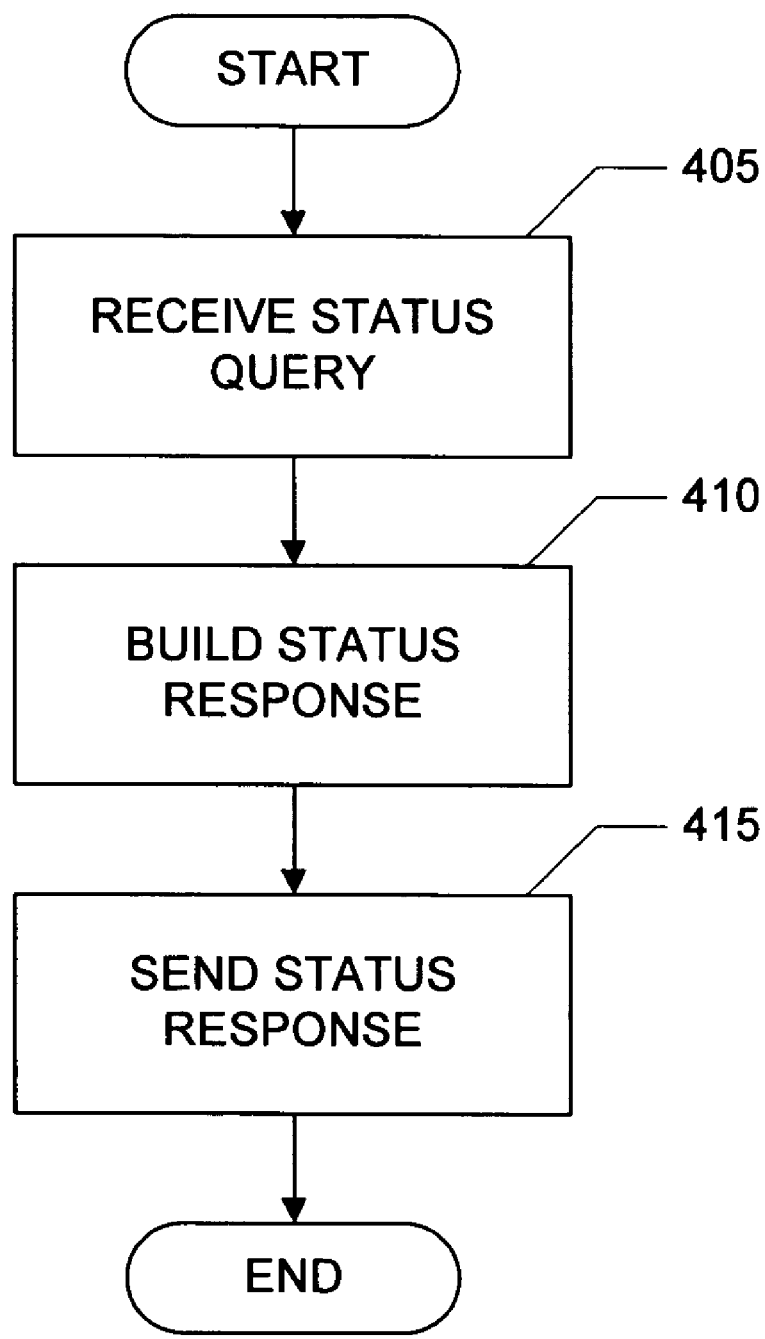

NETWORK PARTICIPANT STATUS EVALUATION

BACKGROUND

When two wireless computing devices have established a wireless connection, the devices can interact across that connection, such as exchanging data. For example, two wireless-enabled laptop computers can establish a wireless connection (e.g., establishing a wireless connection using interfaces according to IEEE 802.11 or "Wi-Fi") and execute respective application programs that each use data provided by the application program executing on the other device, such as a network game application program.

In an environment with multiple wireless devices each executing different application programs, it can be desirable for a user of one device to know what application programs are being executed on other devices in the area.

SUMMARY

The present invention provides methods and apparatus for obtaining and providing status information for network devices. In one implementation, a wireless device includes: an antenna; a wireless communication interface connected to said antenna and supporting wireless communication across a wireless connection provided by said antenna; a memory supporting storing data; and a controller connected to said wireless interface and to said memory, supporting an application service and a network evaluation service; wherein said application service provides execution and management of one or more application programs accessible by said controller using application data stored in said memory, said network evaluation service provides evaluation of status information of other devices available for wireless communication through said wireless interface and provides status information of the wireless device to another device upon request, and status information provided by said network evaluation service includes information indicating at least one application program for which application data is stored in said memory.

In another implementation, a network device includes: a network communication interface supporting network communication across a network connection; a memory supporting storing data; and a controller connected to said network interface and to said memory, supporting an application service and a network evaluation service; wherein said application service provides execution and management of one or more application programs accessible by said controller using application data stored in said memory, said network evaluation service provides evaluation of status information of other devices available for network communication through said network interface and provides status information of the network device to another device upon request, and status information provided by said network evaluation service includes information indicating at least one application program for which application data is stored in said memory.

In another implementation, a method of obtaining status information includes: receiving a status request at a wireless device; sending a status query through a wireless interface of said wireless device; receiving at least one status response through said wireless interface from at least one respective device to which a status query was sent; and building a status report based on said received at least one status response; wherein said status response indicates at least one application program executing on the device corresponding to that status response.

In another implementation, a method of providing status information includes: receiving a status query at a first wireless device through a wireless interface from a second wireless device; building a status response indicating at least one application program executing on said first wireless device; and sending said status response through said wireless interface to said second wireless device.

BRIEF DESCRIPTION OF THE DRAWINGS

FIG. 4 shows a flowchart of one implementation of providing status information.

DETAILED DESCRIPTION

The present invention provides methods and apparatus for obtaining and providing status information for network devices. In one implementation, a wireless device provides a network evaluation service that determines what types of application programs are executing on or potentially available to other wireless or network devices in the local area. The wireless devices sends status queries to the other devices requesting application program information and builds a status report based on the received responses.

An illustrative example of one implementation is presented below. This example is not exhaustive and additional examples and variations are also described later.

In one example, a person brings a wireless game device into an area with multiple other people each having respective wireless game devices, such as in a "game café" establishment. Some of the people are playing games with one another in groups of two or more across wireless connections established between their wireless devices. The new person activates his wireless device and requests a status report from the device to determine what games people in the area are playing. The wireless device builds a status report for the user indicating what game applications are being executed on game devices that can be contacted by the wireless device.

To build the status report, the wireless device polls the area for responsive wireless devices, such as by sending out a beacon signal using the device's wireless interface (e.g., a Wi-Fi interface). The wireless device builds a list of devices that responded to the polling. The wireless device then sends a status query to each of the devices on the list. The status query requests information indicating what application program is currently being executed on the wireless device receiving the query. Each of the devices receiving a query sends a status response indicating the currently executing application program (if any) back to the wireless device. The wireless device builds a status report from the received responses.

In this way, the wireless device provides information to a user indicating what application programs are being executed by other wireless devices that are available for interaction. The status information can provide a convenient mechanism for determining what games are being played and who might be interested in playing a game. Accordingly, a user of the wireless device can advantageously use this information to determine if there is another person or people playing a type of game that the user would like to join or invite to play a new game. This functionality can then promote easier match-making for multiplayer games.

Figure 1A:
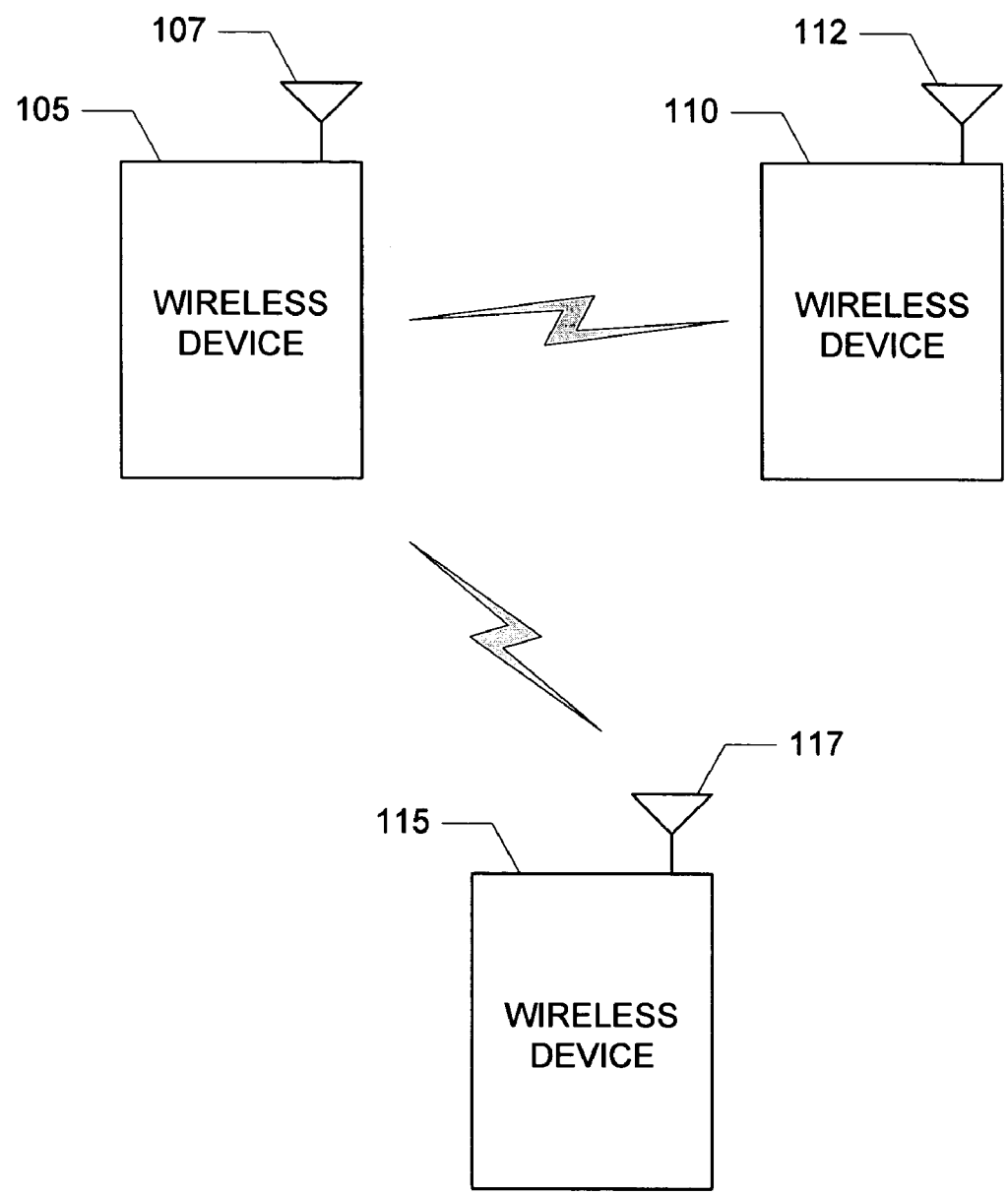
FIG. 1A shows three wireless devices having respective wireless antennas in communication to exchange status information.

FIG. 1A shows three wireless devices 105, 110, and 115 having respective wireless antennas 107, 112, and 117 in communication to exchange status information. In one implementation, the wireless devices 105, 110, 115 are wireless-enabled game or general-purpose computing devices (e.g., game devices or laptop computers supporting Wi-Fi interfaces). Using its antenna 107, the wireless device 105 establishes wireless connections with the other wireless devices 110 and 115. The wireless device 105 requests and obtains status information from the other wireless devices 110, 115 across the open connections. As described below, in one implementation, the status information indicates application programs being executed on the wireless devices 110, 115. In other implementations, status information for a wireless device can indicate other information, such as application programs for which data has been stored in the memory of the wireless device or identification information. The wireless devices 110 and 115 can also request and obtain status information from the other wireless devices.

Figure 1B:
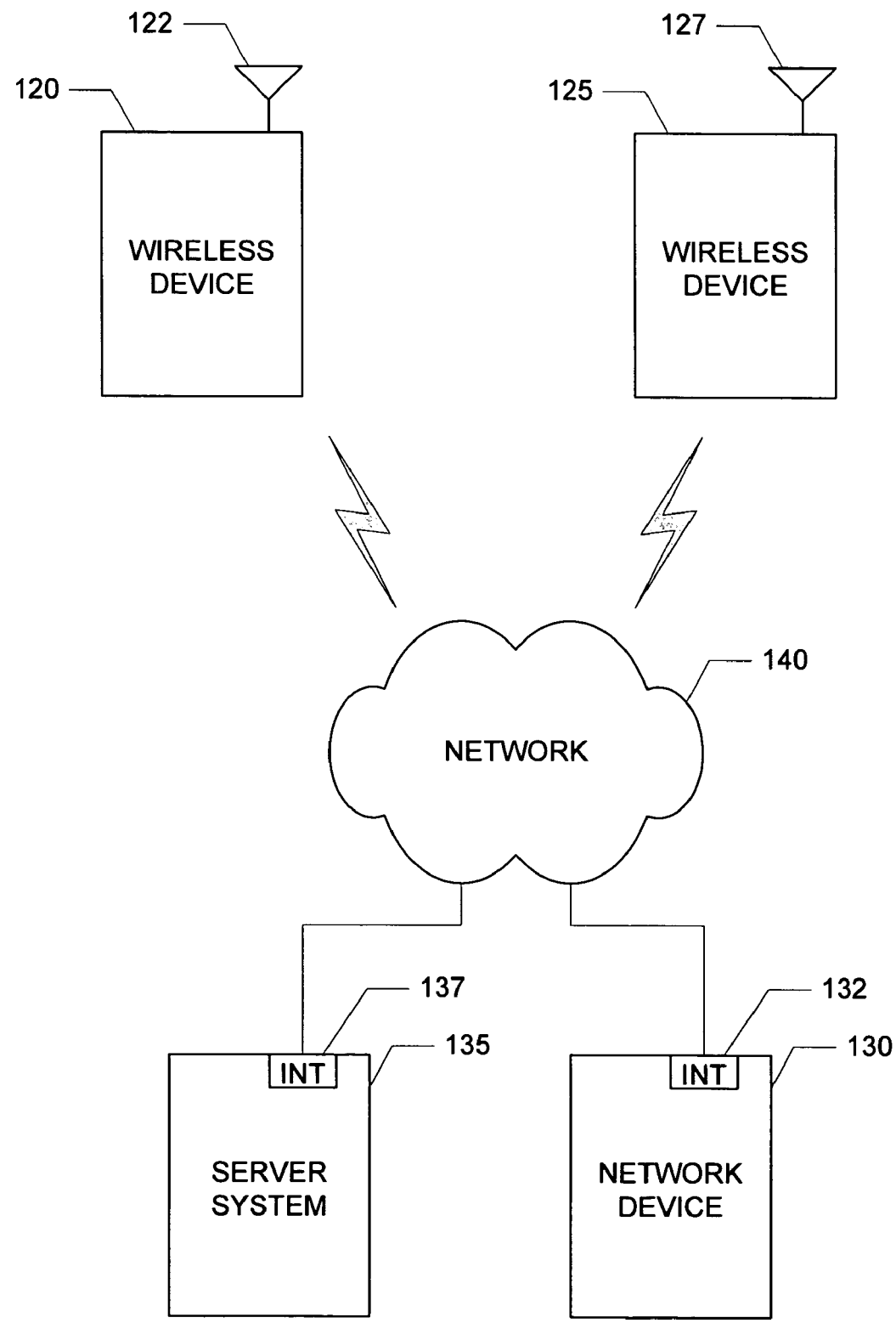
FIG. 1B shows another network environment where two wireless devices a network device, and a server system communicate through a network to exchange status information.

FIG. 1B shows another network environment where two wireless devices 120, 125, a network device 130, and a server system 135 communicate through a network 140 to exchange status information. The wireless devices 120 and 125 communicate with the network 140 through wireless connections using respective antennas 122 and 127. The network device 130 and server 135 communicate with the network 140 through wired connections using respective network interfaces 132 and 137. In one implementation, the network device 130 is a network-enabled computing device, such as a laptop computer or a game console having a network interface. In one implementation, the server 135 is a computing system providing data and/or application serving to connecting clients (such as the wireless devices 120, 125 and the network device 135). In one implementation, the network 140 is a local area network (LAN). In another implementation, the network 140 is a wider network, such as the Internet or a private intranet.

Similar to the devices described above referring to FIG. 1A, the wireless device 120 can request and obtain status information from the other wireless device 125, the network device 130, and the server 135. In one implementation, the devices provide the status information directly to a requesting device across established connections. In another implementation, the server 135 provides centralized storage of status information and so the devices provide status information to the server 135 (e.g., periodically or upon demand) and request status information from the server 135. Alternatively, the server 135 provides different information that complements the status information exchanged among the devices. For example, the server 135 provides a map image representing the physical locations of devices indicated by identifiers exchanged as status information and an individual device (e.g., wireless device 120) can annotate that map image with other status information (e.g., what application program is being executed by a particular device).

While FIGS. 1A and 1B illustrate two network configurations, in other implementations, other network configurations can be used. For example, in one implementation, a collection of wired network devices exchange status information through a LAN or wider network, without using wireless connections. In another example, various types of wireless devices are used, such as cellular phones and PDA's.

Figure 2:
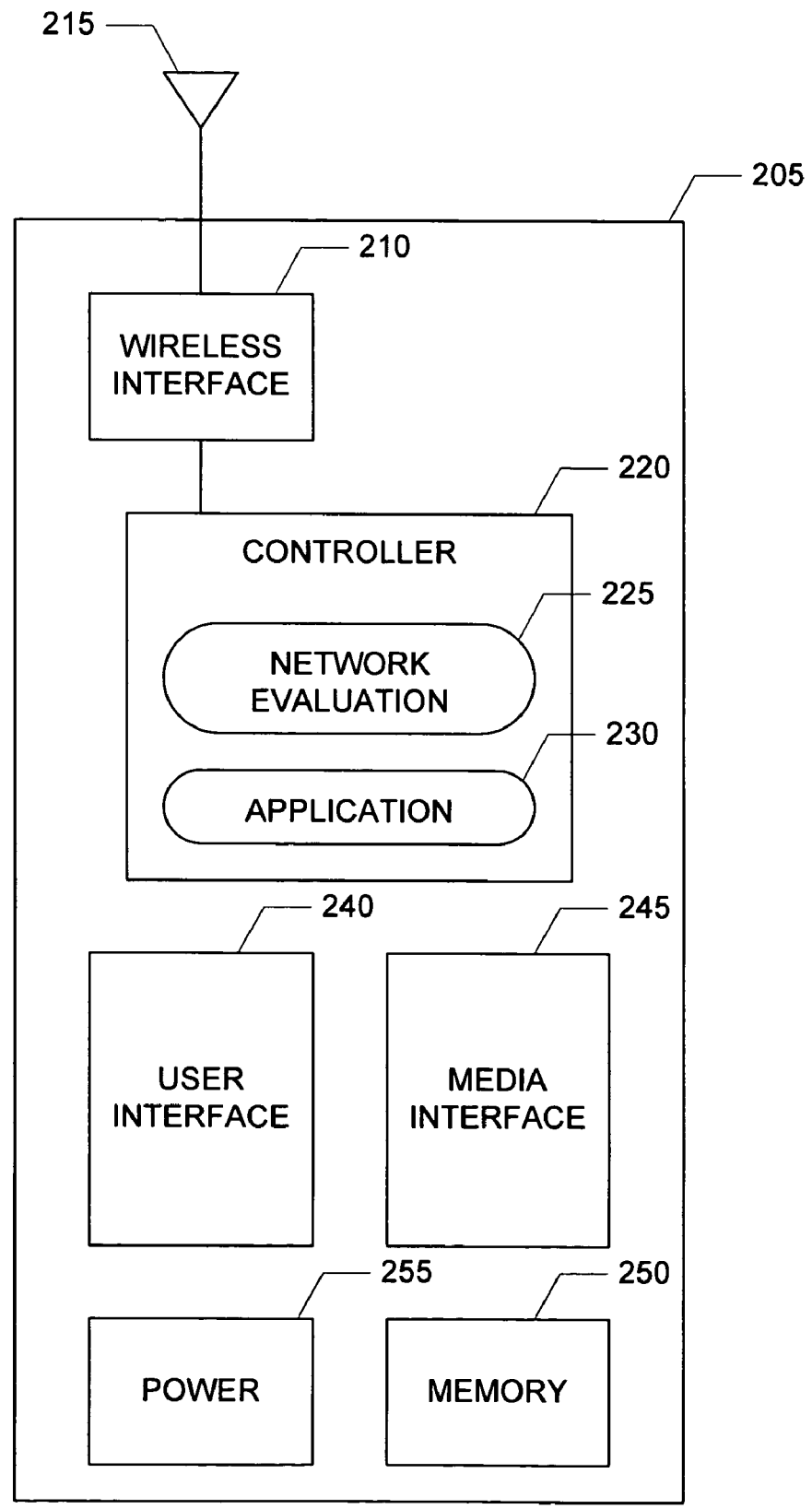
FIG. 2 shows a block diagram of one implementation of a wireless device supporting obtaining and providing status information.

FIG. 2 shows a block diagram of one implementation of a wireless device 205 supporting obtaining and providing status information. The wireless device 205 includes a wireless interface 210 connected to an antenna 215. The wireless interface 210 supports establishing a wireless connection to another wireless device using the antenna 215 and exchanging data across an open connection. In one implementation, the wireless interface 210 supports a local wireless protocol such as Wi-Fi or Bluetooth. In another implementation, a different air interface can be supported, such as CDMA, or a non-radio interface, such as infrared. In another implementation, multiple wireless interfaces are supported and/or one or more wired interfaces (e.g., IEEE-1394 or Ethernet).

A controller 220 is connected to the wireless interface 210. The controller 220 controls the operation of the wireless device 205 and its components. In one implementation, the controller 220 is a microprocessor and related sub-systems. The controller 220 provides a network evaluation service 225 and an application service 230. The network evaluation service 225 supports obtaining and providing status information, as described below. The application service 230 supports the execution of application programs accessible to the wireless device 205 and management of corresponding application data.

The wireless device 205 also includes a user interface 235, a media interface 240, a memory 245, and a power source 250. The user interface 235 provides input controls to receive user commands (e.g., a keypad, buttons, a directional pad or joystick, etc.) and output components to provide data to the user (e.g., a display and audio speakers). The media interface 240 provides components to connect to or accept media to exchange data with the media, according to the type of media. In one implementation, the media interface 240 provides an interface to removably receive an optical disc to read data from the disc (e.g., a CD-ROM drive) and another interface to connect to a removable memory component to read data from and write data to the memory component (e.g., a USB port to accept a USB memory card, or a Memory Stick™ interface). The memory 245 provides storage for data used in the operation of the wireless device 205 and in application execution. For example, in one implementation, status information is stored in the memory 245. In one implementation, the memory 245 is a combination of RAM and flash memory. The power source 250 provides power to the components of the wireless device 205. In one implementation, the power source 250 provides an interface for drawing power from removable batteries and a rechargeable internal power source with a corresponding external power connection. In FIG. 2, the interconnections among the user interface 235, media interface 240, memory 245, and power source 250, and with the other components of the wireless device 205 are not shown for clarity, though these connections will be appreciated by one of ordinary skill.

In another implementation, a network device that is not wireless-enabled but does support an interface for communication with other devices provides similar components to the wireless device shown in FIG. 2. The network device includes a controller providing application and network evaluation services, and so also provides and obtains status information as described below. As described above referring to FIG. 1B, a combination of wireless devices and network devices can be used to share status information.

Figure 3:
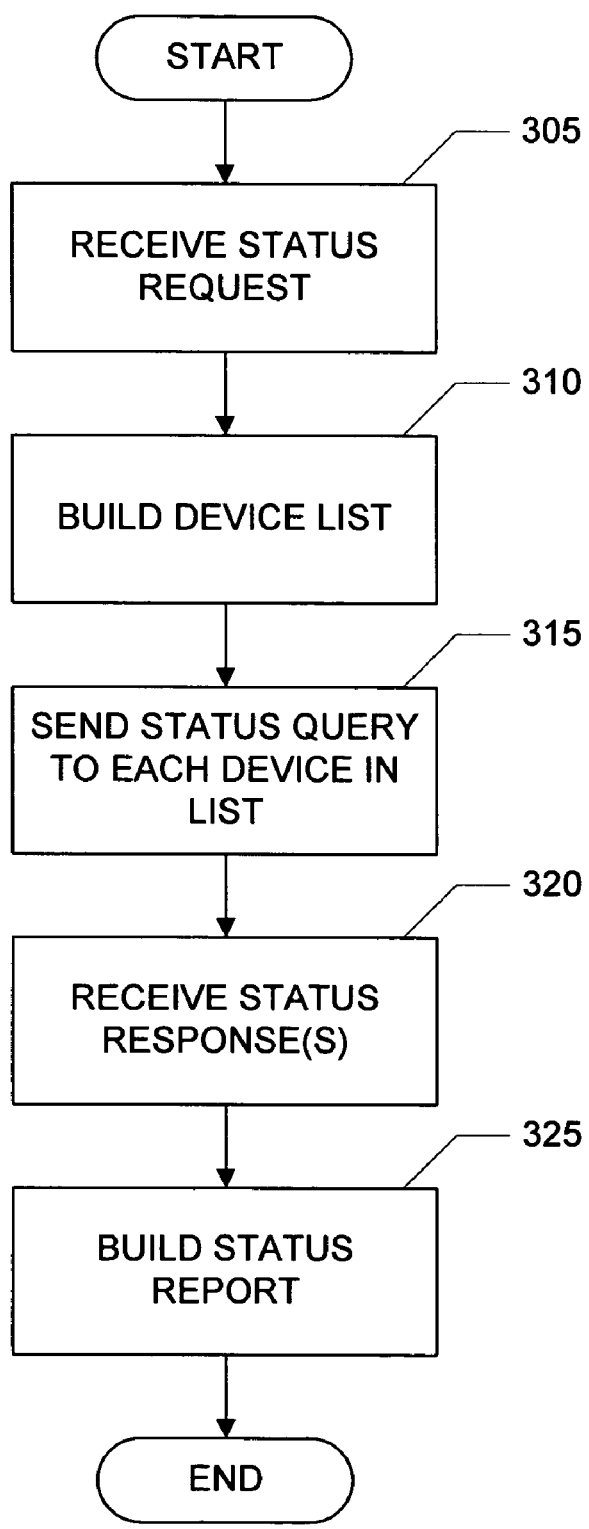
FIG. 3 shows a flowchart of one implementation of obtaining status information.

FIG. 3 shows a flowchart 300 of one implementation of obtaining status information. Initially, a user has activated a wireless device that supports obtaining and providing status information, such as the wireless device 205 of FIG. 2. In the area of the user are one or more other devices also supporting status information.

The user submits a status request to the wireless device, block 305. The user inputs a status request through the user interface of the wireless device, such as by selecting a "status request" command from a menu or list of commands presented on a display of the wireless device. The wireless device receives and processes the request. In one implementation, the user can specify particular information to be obtained and reported (e.g., which local devices are currently executing a particular application program, or whether a particular user is present in the local area as indicated by a user identifier).

In response to the status request, the wireless device builds a list of local devices available for communication with the wireless device, block 310. In one implementation, the wireless builds a new list. In another implementation, the wireless device updates an existing list, or determines whether to update an existing list depending on the last update time.

In one implementation, the wireless device builds the local device list by polling the area for devices. The wireless device sends out a beacon signal using the wireless interface of the wireless device. A beacon signal is a signal requesting a response from any device receiving the beacon signal. In one implementation, the wireless device uses a UDP broadcast message (or other network broadcast message) as the beacon. The beacon signal identifies the wireless device and provides connection information to facilitate establishing a connection (or at least sending data to) the wireless device. The wireless device receives beacon responses from local devices. Some devices may not response to the beacon due to privacy or security settings set by the devices' users. A beacon response indicates a sender identifier and connection information to facilitate establishing a connection (or at least sending data to) the sender of the beacon response. The wireless device adds the sender (identifier and connection information) of each received beacon response to the local device list. In one implementation, the wireless device collects responses to the beacon for a predetermined period of time before proceeding with obtaining status information. In another implementation, the wireless device sends a request for responses onto a network to build the device list, instead of or in addition to wireless polling the local area.

After building the device list, the wireless device sends a status query to each device on the device list, block 315. The wireless device sends a status query to each device using the wireless interface of the wireless device. In one implementation, the wireless device sends a respective status query to each device. The wireless device uses the information provided by the beacon responses to send the status query to the devices on the list. In another implementation, the wireless device sends the status query as a broadcast message to the local area and/or network environment (e.g., broadcasting a request through the IP stack of the device).

In one implementation, the status query is a request for information indicating which application program is currently executing on the device receiving the query. In other implementations, the status query is a request for different or additional status information. For example, in one implementation, the status query requests status information indicating whether the recipient device is executing an application program that is hosting a game, what game is being hosted, and other appropriate information to facilitate joining that game (e.g., port information or what players are already participating). Other examples of status information include, but are not limited to: the mode in which an application program is being executed, such as whether a game application program is being played as a single player game (offline) or as a multiplayer game with other players; application data stored in the memory or in removable memory of the recipient indicating current or past data or state information generated by an application program (e.g., high scores, levels completed, current score); which application programs correspond to application data stored in the memory or in removable memory of the recipient; which application program(s) have been executed recently by the recipient, or corresponding frequency or usage information; identity information identifying the recipient device or a user of the recipient device, such as a predetermined profile (e.g., name and favorite game); operation or status information of the recipient device, such as physical location as determined by GPS components or network system or address information. In one implementation, the status query indicates the particular status information to be provided (e.g., as specified in the status request submitted by the user).

The wireless device receives status responses from the other devices, block 320. The wireless device receives the status responses through the wireless interface of the wireless device. A status response includes the status information requested by the status query (implicitly or explicitly). If information is not available, the status response indicates so (e.g., no application program is being executed). In another implementation, if the requested status information is not available, a device does not send a status response. The wireless device stores the status responses in the memory of the wireless device. In one implementation, the wireless device collects status responses for a predetermined period of time before proceeding.

After receiving status responses, the wireless device builds a status report to present to the user, block 325. The wireless device compiles the collected status information into a report. The format of the report can be predefined or set by the user of the device. For example, one status report format shows a table of devices and corresponding application programs. Another example of a status report shows a table of users and corresponding high scores achieved in particular application programs (games). The wireless device presents the status report to the user through the user interface of the wireless device (e.g., display). In one implementation, the wireless device dynamically builds and updates the report as status response are received.

In one implementation, after a user has reviewed the status report, the user can submit another status request for further information based on the earlier report. For example, the user reviews a first status report indicating three people in the area are playing a particular sports game. The user would like to know which player has the highest score for that game and so submits a second request for a status report, indicating the particular game and devices and that the high score data is the desired information. The wireless device sends out additional status queries to the indicated devices for the additional status information and prepares supplemental status report based on the received information. The same process can be repeated to further refine information retrieval.

In another implementation, the wireless device does not build a list of local devices. In this case, the wireless device includes the status query in the beacon signal. A device receiving the beacon signal that sends a response to the beacon includes the requested status information in its response. The wireless device then builds the status report based on received responses.

FIG. 4 shows a flowchart 400 of one implementation of providing status information. Initially, a user has activated a wireless device a wireless device that supports obtaining and providing status information, such as the wireless device 205 of FIG. 2. In the area of the user are one or more other devices also supporting status information.

The wireless device receives a status query from another wireless device in the area, block 405. The wireless device receives the status query through the wireless interface of the wireless device. In one implementation, before receiving a status query, the wireless device responds to a beacon sent by the querying device to indicate that the wireless device is available for communication with the querying device, or has otherwise established that the wireless device is available (e.g., through contacting the querying device or through information stored on a local server). The status query indicates status information that the querying device is requesting to be sent back to the querying device. The status query also indicates identification information and connection information to facilitate sending data to the querying device. The indicated status information can be included explicitly in the query or is implicit in the status query. For example, in one implementation, any status query received is understood to be a request for status information indicating the application program currently being executed by the device receiving the query. In another example, the status query includes a type code or specific query information to indicate the status information to be returned.

In response to the status query, the wireless device builds a status response, block 410. To build the status response, the wireless device collects status information indicated by the status query (implicitly and/or explicitly). As described above, various types of status information can be requested and the wireless device collects the appropriate information, such as from the memory or removable memory of the wireless device or from removable media available to the wireless device. In an alternative implementation, the wireless device accesses another device to collect status information. In one implementation, the wireless device confirms with the user that the wireless device should respond to the status query before building or sending the status response. In another implementation, the wireless device notifies the user that a status response is being sent.

If requested information is not available (e.g., the removable memory storing that information has been removed), unknown, or not applicable (e.g., no application program is being executed at the time), the wireless device includes an appropriate indicator. Alternatively, if all the information requested in the status query is not available, the wireless device ignores the status query. In that case, the querying device recognizes failures to respond as possible indications of no appropriate information.

Similarly, if information requested by the status query is indicated as being protected or private by user settings of the wireless device, the wireless device will not include that private information in the status response. Accordingly, a user can indicate that some or all status information of that device or a storage device (e.g., removable memory) is private. In one implementation, the wireless device confirms with the user that the wireless device may include private information in a status response. Privacy settings can be conditional as well. For example, a user can indicate that certain information is private but the information can be shared (included in a status response) in response to a status query identifying a particular user or device, or providing an appropriate password. In addition, secure connections can be requested and used as part of the negotiation in exchanging status information.

After building the status response, the wireless device sends the status response back to the querying device, block 415. The wireless device sends the status response using the wireless interface of the wireless device and the connection information received from the querying device (e.g., received along with or as part of the status query). In another implementation, the status query indicates a different location to which the status response is to be sent, such as to a server. Alternatively, the wireless device sends the status response to a default location or a location indicated by user settings.

The various implementations of the invention are realized in electronic hardware, computer software, or combinations of these technologies. Some implementations include one or more computer programs executed by a programmable processor or computer. For example, referring to FIG. 1A, in one implementation, the wireless device 105 includes one or more programmable processors. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations using wireless devices, other network devices can provide and obtain status information as described above, using wired or wireless networks.

In addition, rather than status information related to game application programs, other application programs can also be used, such as scientific, communications, etc. In that case, the status information exchanged would be selected to reflect the nature of the application programs being addressed (e.g., most recent network test results for network analysis application programs). The status information can advantageously be used to determine the types of application programs being used in group of devices (e.g., defined by local proximity or identifiers) and information being collected or generated by those application programs and devices.

Accordingly, the present invention is not limited to only those implementations described above.

What is claimed is:

1. A wireless device, comprising:

an antenna;

a wireless communication interface connected to said antenna and supporting wireless communication across a wireless connection provided by said antenna;

a memory supporting storing data; and a controller connected to said wireless interface and to said memory, supporting an application service and a network evaluation service;

wherein said application service provides execution and management of at least one application program accessible by said controller using application data stored in said memory, wherein said network evaluation service manages a transfer of data between the wireless device and a second wireless device by:
1) sending out a beacon signal identifying the wireless device and providing connection information, polling an area for responsive wireless devices, and determining whether to build a new list or update an existing list of the responsive devices;
2) receiving a signal from the second wireless device that identifies the second wireless device and provides connection information;
3) specifying status information and sending a status query to each device on a list of responsive devices requesting the specified status information; and
4) responding to a status query from the second wireless device with a specific combination of status information as a function of a requested combination of status information, and wherein the status information provided by said network evaluation service includes information indicating at least one application program for which application data is stored in said memory.

2. The wireless device of claim 1, wherein said status information further includes exchanged identifiers that indicate physical locations of devices.

3. The wireless device of claim 1, wherein:
said status information provided by said network evaluation service includes information indicating the at least one application program being executed by said controller.

4. The wireless device of claim 1, wherein:
said state information designates frequency or usage information generated by said at least one application program.

5. The wireless device of claim 1, wherein:
said application data stored in said memory includes saved game data for a game application program.

6. A network device, comprising:
a network communication interface supporting network communication across a network connection;
a memory supporting storing data; and
a controller connected to said network interface and to said memory, supporting an application service and a network evaluation service;
wherein said application service provides execution and management of at least one application program accessible by said controller using application data stored in said memory,
wherein said network evaluation service manages a transfer of data between the wireless device and a second wireless device by:
1) sending out a beacon signal identifying the wireless device and providing connection information, polling an area for responsive wireless devices, and determining whether to build a new list or update an existing list of the responsive devices;
2) receiving a signal from the second wireless device that identifies the second wireless device and provides connection information;
3) specifying status information and sending a status query to each device on a list of responsive devices requesting the specified status information; and
4) responding to a status query from the second wireless device with a specific combination of status information as a function of a requested combination of status information, wherein the status information provided by said network evaluation service includes information indicating at least one application program for which application data is stored in said memory.

7. The network device of claim 6,
wherein said status information further includes exchanged identifiers that indicate physical locations of devices.

8. The network device of claim 6, wherein:
said status information provided by said network evaluation service includes information indicating the at least one application program being executed by said controller.

9. The network device of claim 6,
wherein a combination of at least one wireless device and at least one network device are used to share said status information.

10. A method of obtaining status information, comprising:
sending out a beacon signal identifying a first wireless device and providing connection information, polling an area for responsive wireless devices, and determining whether to build a new list or update an existing list of the responsive devices;
receiving a signal from a second wireless device that identifies the second wireless device and provides connection information;
specifying status information;
sending a status query to each device on the list of responsive devices requesting a specified combination of the status information;
receiving at least one status response comprising a specific combination of status information as a function of a requested combination of status information from at least the second wireless device; and
building a status report based on said received at least one status response,
wherein said status response indicates at least one application program executing on the device corresponding to that status response, and
wherein said status query indicates the location to which the at least one status response is to be sent.

11. A method of providing status information, comprising:
sending out a beacon signal identifying a first wireless device and providing connection information, polling an area for responsive wireless devices, and determining whether to build a new list or update an existing list of the responsive devices;
receiving a signal from a second wireless device that identifies the second wireless device and provides connection information;
receiving a status query from the second wireless device requesting a specific combination of status information;
building a status response comprising a requested combination of the status information as a function of a specific combination of status information requested by the second wireless device; and
sending said status response through said wireless interface to said second wireless device,
wherein said status query indicates the location to which the at least one status response is to be sent.

12. The method of claim 11, wherein:
at least one of said at least one application program indicated by said status response is a game application program.

13. A computer program, stored on a tangible storage medium, for use in obtaining status information, the program comprising executable instructions that cause a computer to:
- send a beacon signal identifying a first wireless device and providing connection information;
- poll an area for responsive wireless devices;
- determine whether to build a new list or update an existing list of the responsive devices;
- receive a signal from a second wireless device that identifies the second wireless device and provides connection information;
- specify status information;
- send a status query to each device on a list of responsive devices requesting specific status information; and
- process at least one status response comprising at least one response comprising the requested combination of status information as a function of a specific combination of status information requested by the second wireless device; and
- build a status report based on said received at least one status response,
  - wherein said status response indicates at least one application program executing on the device corresponding to that status response, and
  - wherein said status query indicates the location to which the at least one status response is to be sent.

14. A system for providing status information, comprising:
- means for sending a beacon signal identifying a first wireless device and providing connection information,
- means for polling an area for responsive wireless devices, and
- means for determining whether to build a new list or update an existing list of the responsive devices;
- means for building a list of the responsive devices;
- means for receiving a signal from a second wireless device that identifies the second wireless device and provides connection information;
- means for receiving a status query from the second wireless device requesting status information;
- means for building a status response to a request for a specified combination of status information from a plurality of available status information indicating at least one application program executing on the system as a function of a specific combination of status information requested by the second wireless device; and
- means for sending said status response to said second wireless device,
  - wherein said status query indicates the location to which the at least one status response is to be sent.

15. A computer program, stored on a tangible storage medium, for use in providing status information, the program comprising executable instructions that cause a computer to:
- send a beacon signal identifying a first wireless device and providing connection information;
- poll an area for responsive wireless devices;
- determine whether to build a new list or update an existing list of the responsive devices;
- build a list of the responsive devices;
- receive a signal from a second wireless device that identifies the second wireless device and provides connection information;
- process a status query from the second wireless device requesting status information;
- build a status response to a request of a specified combination of status information from a plurality of available status information indicating at least one application program executing on the computer as a function of a specific combination of status information requested by the second wireless device; and
- send said status response through said wireless interface to said wireless device,
  - wherein said status query indicates the location to which the at least one status response is to be sent.

* * * * *